US011233899B2

United States Patent
Michaelis et al.

(10) Patent No.: US 11,233,899 B2
(45) Date of Patent: Jan. 25, 2022

(54) AUTOMATIC JOINING OF SIMULTANEOUS OUTGOING AND INCOMING CALLS THAT HAVE THE SAME FAR-END CALLER ID

(71) Applicant: Avaya Inc., Santa Clara, CA (US)

(72) Inventors: Matthew Roller Michaelis, Louisville, CO (US); Paul Roller Michaelis, Louisville, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/719,515

(22) Filed: Dec. 18, 2019

(65) Prior Publication Data
US 2021/0195021 A1    Jun. 24, 2021

(51) Int. Cl.
*H04M 3/436* (2006.01)
*H04M 3/42* (2006.01)
*H04M 1/57* (2006.01)

(52) U.S. Cl.
CPC ........... *H04M 3/436* (2013.01); *H04M 1/573* (2013.01); *H04M 3/42042* (2013.01); *H04M 3/42059* (2013.01); *H04M 3/42153* (2013.01)

(58) Field of Classification Search
CPC ......... H04W 8/02; H04W 8/18; H04W 8/183; H04W 8/22; H04W 4/16; H04W 88/00; H04M 3/42042; H04M 3/42059; H04M 42/025; H04M 3/42085; H04M 1/006; H04M 1/571
See application file for complete search history.

(56) References Cited

U.S. PATENT DOCUMENTS

| | | | | |
|---|---|---|---|---|
| 4,574,164 A | * | 3/1986 | Orikasa ................. | H04W 84/02 455/458 |
| 5,381,415 A | * | 1/1995 | Mizutani ............ | H04Q 11/0428 370/447 |
| 5,473,671 A | * | 12/1995 | Partridge, III ........ | H04M 1/663 455/445 |
| 6,266,399 B1 | * | 7/2001 | Weller ................ | H04M 1/6505 379/142.06 |
| 7,006,618 B1 | * | 2/2006 | Shaffer ............... | H04M 1/2535 379/202.01 |
| 8,027,442 B2 | * | 9/2011 | Crandell ............... | H04M 15/68 379/142.06 |
| 8,233,607 B1 | * | 7/2012 | Ambrose .......... | H04M 3/42212 379/201.01 |

(Continued)

FOREIGN PATENT DOCUMENTS

CN    104333666    2/2015

*Primary Examiner* — Jean A Gelin
(74) *Attorney, Agent, or Firm* — Sheridan Ross P.C.

(57) ABSTRACT

Endpoints, such as telephones, on a communication network may request an interactive communication with another endpoint. While the request is being processed, the calling endpoint may receive a call from the called endpoint. Systems and methods are provided that automatically allow one endpoint to accept the incoming call, such as by joining the two calls, and terminating their outbound call. As a result, endpoints attempting to call each other may be connected with a single call without requiring any endpoint to be routed to voicemail due to their called endpoint being busy. Additionally, arbitration rules may be provided to resolve any "race condition" where both endpoints would otherwise each accept or each decline their incoming call.

20 Claims, 5 Drawing Sheets

(56) References Cited

U.S. PATENT DOCUMENTS

| | | | |
|---|---|---|---|
| 8,404,234 B2* | 3/2013 | Allison | A61P 1/04 424/138.1 |
| 8,576,270 B1* | 11/2013 | Vitale | H04M 3/53308 348/14.01 |
| 8,755,842 B2* | 6/2014 | Miller | H04M 1/677 455/565 |
| 8,805,335 B2* | 8/2014 | Vogedes | H04M 3/4288 379/88.12 |
| 10,402,910 B1* | 9/2019 | Kunz | G06Q 40/12 |
| 2002/0147002 A1* | 10/2002 | Trop | H04M 15/51 455/406 |
| 2005/0063529 A1* | 3/2005 | Meldrum | H04M 3/465 379/211.04 |
| 2007/0097994 A1* | 5/2007 | Samdadiya | H04L 29/06027 370/401 |
| 2009/0274284 A1* | 11/2009 | Arsenault | H04M 15/06 379/142.1 |
| 2010/0203863 A1* | 8/2010 | Kapelushnik | H04L 12/1453 455/406 |
| 2010/0234000 A1* | 9/2010 | Mase | H04W 76/38 455/414.1 |
| 2011/0194678 A1* | 8/2011 | Lewis | H04M 1/72519 379/88.19 |
| 2011/0263235 A1* | 10/2011 | Kassiedass | H04M 1/578 455/415 |
| 2012/0015657 A1* | 1/2012 | Comsa | H04W 72/04 455/436 |
| 2015/0049160 A1* | 2/2015 | Krishnamoorthy | H04L 65/1089 348/14.03 |
| 2016/0337825 A1* | 11/2016 | Piscopo, Jr. | H04L 65/1016 |
| 2017/0311242 A1* | 10/2017 | Puranik | H04W 76/10 |
| 2018/0013888 A1* | 1/2018 | Zhao | H04W 4/16 |
| 2018/0309801 A1* | 10/2018 | Rathod | H04L 67/141 |

* cited by examiner

AUTOMATIC JOINING OF SIMULTANEOUS OUTGOING AND INCOMING CALLS THAT HAVE THE SAME FAR-END CALLER ID

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for networking devices and particularly to network topology and connection of nodes to communicate on the network.

BACKGROUND

Endpoints are devices that convert between forms of human communication (such as voice or video images) and corresponding electronic signals that may be transmitted to and received from other endpoints via telecommunication networks. Typical telecommunication networks include components that may be wired (e.g., the Public Switched Telephone Network (PSTN), Internet, Ethernet, etc.) and/or wireless (e.g., WiFi, Bluetooth, cellular, etc.).

It is not uncommon for a first endpoint to attempt to connect to a second endpoint, but fail because the second endpoint is "busy" (e.g., off-hook, replying with a SIP "486 Busy Here" or "600 Busy Everywhere" message). A situation that can cause the second endpoint to appear "busy" to the first endpoint is if there is a concurrent attempt by the second endpoint to connect to the first. In this scenario, the first endpoint will also appear "busy" to the second endpoint. As a result, even though the parties associated with the two endpoints wish to communicate with each other, a connection between the two will not be established. This may cause one or both endpoints to receive a busy tone or have their call routed to other devices or services, such as voicemail. (A situation in which the described scenario has been observed to occur frequently is when at least one endpoint is a cellular telephone that temporarily loses connectivity mid-conversation, thereby causing both parties to try to reconnect, often simultaneously.)

Some phone systems provide an audio alert to users when there is an incoming call during an active call; users may switch to the incoming call via a manual process, such as performing a switch-hook flash. One solution of the prior art enables endpoints that support multiple line appearances; for example, if Tom is using an Avaya desktop phone and dials Jane's number on Line 1, and then Tom sees Jane's Caller ID appear on Line 2, Tom can press the button for Line 2 to speak with Jane.

For devices without such features, each caller may see the missed call and attempt the call again, which may succeed if one caller is able to get the other endpoint to ring (or otherwise receive the request for the communication) before going off-hook. If the callers attempt to call each other while both are off-hook, then the process repeats. An automatic process that would join simultaneous outgoing and incoming calls that have the same far-end caller identification is needed.

SUMMARY

As a general introduction to the embodiments herein, and as an embodiment, a first endpoint that is currently attempting to place a call to a second endpoint and, while the attempt is ongoing, receives an incoming call having an identifier (e.g., caller-ID) matching that of the second endpoint, the calls will be automatically joined.

In one embodiment, the identifier is required to be an exact match to the dialed number (the number of the second endpoint). In other embodiments, non-identical matches may be determined to be a match. For example, the US dialing schema requires inter-Local Access and Transport Area (interLATA), and some intraLATA, telephone numbers to be dialed with a leading "1," however, calls received are identified with the "1" omitted. Accordingly, only a subset of numbers dialed/received as an identifier may be utilized to determine a match.

In another embodiment, the received identifier may be associated with the same user as the number dialed. Therefore, while the number (endpoint) may differ, the user is the same and, accordingly, may be considered to be a match. This may be further expanded for a plurality or range of numbers. For example, a user may attempt to call a business and concurrently be called by one of a number of endpoints having an identifier associated with the business and, therefore, any one of those identifiers may be determined to match the called number. Additionally or alternatively, the match may be with regard to a name, such as a name associated with caller ID, and a match may be based thereon even if the number does not match. Similar to the above example, a business or other user may have a plurality of endpoints, each with an associated identifier, however if the name matches, even if the number does not, a match may be determined therefrom.

In another embodiment, in which calls to and from the endpoints pass through a single server (e.g., Avaya Communication Manager), the matching-and-joining mechanism may then be implemented as a process within the server. For endpoint-based implementation, an extension to the Telecom Connection library (https://developer.android.com/reference/android/telecom/Connection.html) may be implemented as a stand-alone application or integrated into other applications and/or circuitry.

In embodiments, where one endpoint has implemented the matching-and-joining mechanism described herein and the other endpoint has not, the implementing device then performs the matching-and-joining operation. When both devices implement the matching-and-joining mechanism described herein, additional embodiments are contemplated. Similarly, determining whether a called endpoint has or does not have the matching-and-joining mechanism is also contemplated by further embodiments.

In one embodiment, when a call is received at an endpoint, and while the endpoint is attempting to place a call, the called and calling identifiers are compared to determine if processor of the endpoint determines that a match exists. If a match is found, the incoming calling line is joined and the outgoing called line is dropped, without human intervention.

In another embodiment, a "race condition" could occur when both endpoints implement the match-and-join strategy described herein. To avoid such a condition, one or more rules may be implemented to determine which endpoint will perform the joining operation. In one embodiment, a rule may look at the numbers and give priority to one, for example, the endpoint that has the highest-number Caller ID (e.g., 720-555-1212 is numerically greater than 303-555-1212) could be the one that joins the calls. In another embodiment, a record may be maintained to determine which endpoint, or attributes describing an endpoint, is subject to a particular financial burden to pay for the call. Accordingly, the endpoint having the lowest financial burden may be utilized to join the calls. Rules may be arranged in a hierarchy or other priority as one or more rules may result in a tie and require a tie-breaking rule. Rules may result in a tie due to a particular configuration. For example, one endpoint may have the lower financial burden to pay for the call, but be configured to always decline to join calls if there is any financial burden. If not resolved by a subsequent rule, the user(s) may be presented with the option to decline the call or authorize an exception.

These and other needs are addressed by the various embodiments and configurations of the present invention. The present invention can provide a number of advantages depending on the particular configuration. These and other advantages will be apparent from the disclosure of the invention(s) contained herein.

In one embodiment, a calling endpoint is disclosed, comprising: a data storage comprising a non-transitory data storage component accessible to the processor; a network interface connecting the processor to a network for communications thereon; and wherein the processor performs: initiating a request, for a first call to a called endpoint via the network, the request comprising a first identifier of the called endpoint; before the request is accepted by the called endpoint, receiving a request, via the network, for a second call from a second endpoint, wherein the second endpoint is associated with a second identifier; and upon determining that the first identifier and the second identifier match, accepting one of the first call or the second call and discontinuing the other of the first call or the second call.

In another embodiment, a method is disclosed, comprising: initiating a request, for a first call to a called endpoint via a network, the request comprising a first identifier of the called endpoint; before the request is accepted by the called endpoint, receiving a request, via the network, for a second call from a second endpoint, wherein the second endpoint is associated with a second identifier; and upon determining that the first identifier and the second identifier match, accepting one of the first call or the second call and discontinuing the other of the first call or the second call.

In another embodiment, a communication server, is disclosed comprising: a processor; a data storage comprising a non-transitory data storage component accessible to the processor; a network interface connecting the processor to a network for communications thereon; and wherein the processor performs: receiving a first request for a first call, the call being received from a calling endpoint via the network and the first request comprises a first identifier for a called endpoint; initiating the request connection to the called endpoint; before the first request is accepted by the called endpoint, receiving a second request for a second call to the calling endpoint, the second request being from a second endpoint associated with a second identifier; and upon determining that the first identifier and the second identifier match, accepting one of the first call or second call and discontinuing the other of the first call or second call.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6.

Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
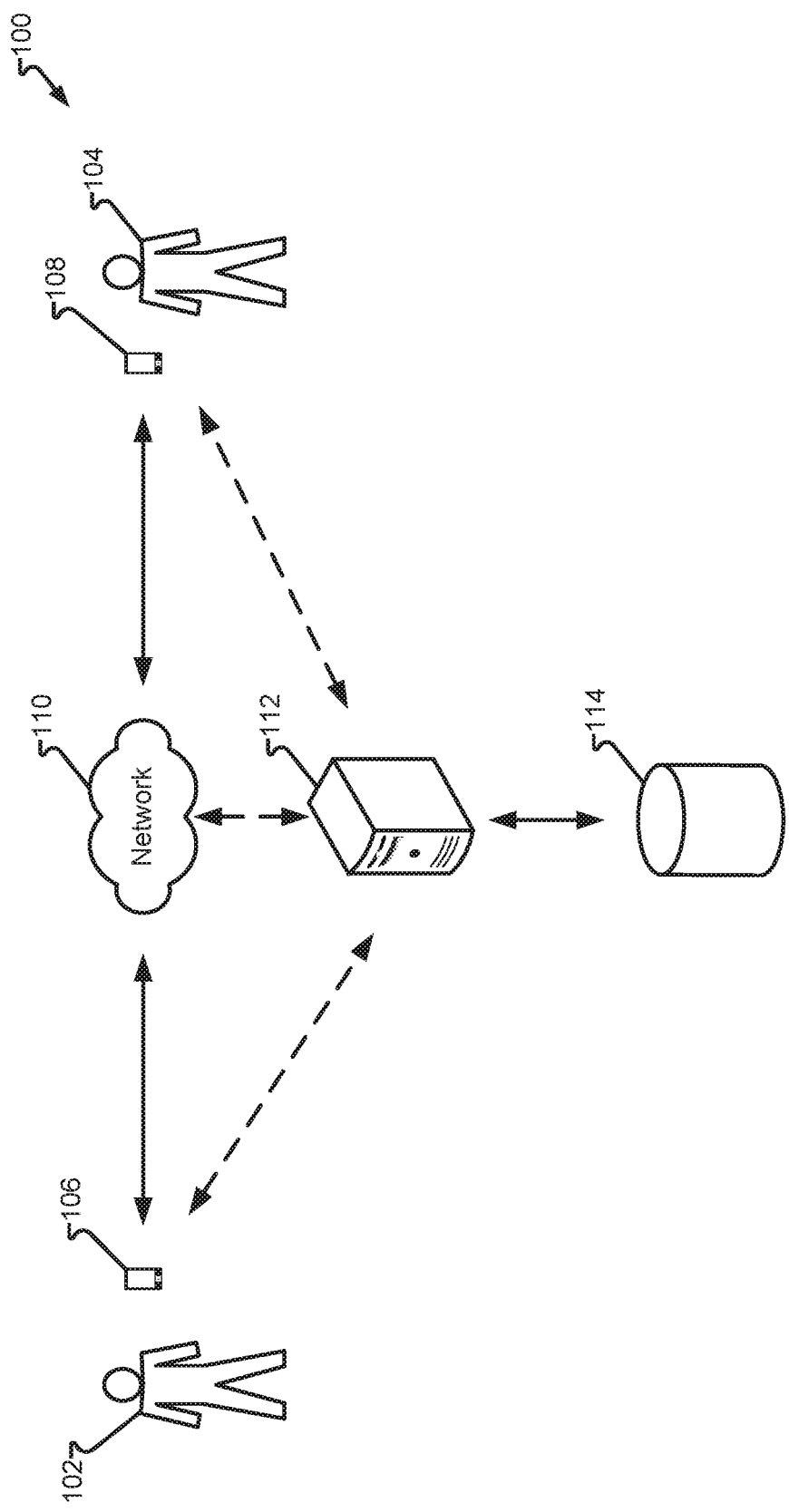
FIG. 1 depicts a first system in accordance with embodiments of the present disclosure.

FIG. 1 depicts system 100 in accordance with embodiments of the present disclosure. In one embodiment, first user 102 attempts to call second user 104 and initiates a call via first endpoint 106 to second endpoint 108 over network 110. After the initiation of the call first endpoint 106 is waiting to be connected to second endpoint 108, but before being answered at second endpoint 108, first endpoint 106 receives an incoming call. An identifier of the incoming call matches an identifier of the outgoing call, such as the caller ID matching the telephone number for second endpoint 108. In response to the match, first endpoint 106 both terminates the outgoing call and receives the incoming call. As a result, first endpoint 106 and second endpoint 108 are connected and first user 102 and second user 104 may conduct their call without either of first endpoint 106 or second endpoint 108 receiving a busy signal, routed to voicemail, or otherwise be treated as a subsequent call to a busy endpoint.

First endpoint 106 and second endpoint 108 are variously embodied to conduct a call via network 110. In one embodiment, one or both of first endpoint 106 and second endpoint 108 may be a cellular telephone, "land line" (e.g., PSTN connected telephone), digital telephone (e.g., Voice over Internet Protocol (VoIP), Session Initiation Protocol (SIP), etc.) or other communication device operable to connect to another endpoint for a real-time interactive communication. While embodiments described herein are generally directed to audio (voice) calls where first user 102 and second user 104 speak and their voice is encoded by first endpoint 106 and second endpoint 108, respectively, to be conveyed on network 110, in other embodiments, the call may comprise video, co-browsing, or other real-time communication over an established point-to-point connection.

Server 112 may comprise one or more processors, memory, and/or other connectivity and processing components. Server 112 may be co-embodied with data storage 114 or have access, such as via a direct connection, network, and/or other connectivity means to data storage 114. Data storage 114 may comprise a non-transitory data storage device or component. While server 112 and data storage 114 are shown as exterior to first endpoint 106 and second endpoint 108, in other embodiments, server 112 and/or data storage 114 may be integrated into one or both of first endpoint 106 or second endpoint 108. It should also be appreciated that other network topologies are contemplated and may be implemented without departing from the scope of the embodiments herein.

In other embodiments, server 112 may be co-embodied with telephone switching and/or routing equipment, such as may facilitate communications within an organization or manage communications that require more than one network, such as an internal network and a public network. Therefore, circuitry and/or at least one processor of server 112 may perform initiating a call, answering, connecting, and/or dropping of calls on behalf of one or more of first endpoint 106 and/or second endpoint 108.

One or both of first endpoint 106 and second endpoint 108 is configured with multi-line presentation and connectivity, such that at least two simultaneous calls may be connected at the same time in series or parallel. Calls in series may allow a first call to be placed on hold while a second call is conducted and then the second call is discontinued or placed on hold to allow the first call to be conducted. Calls in parallel may be conducted to two or more endpoints simultaneously (e.g., conference call).

Figure 2:
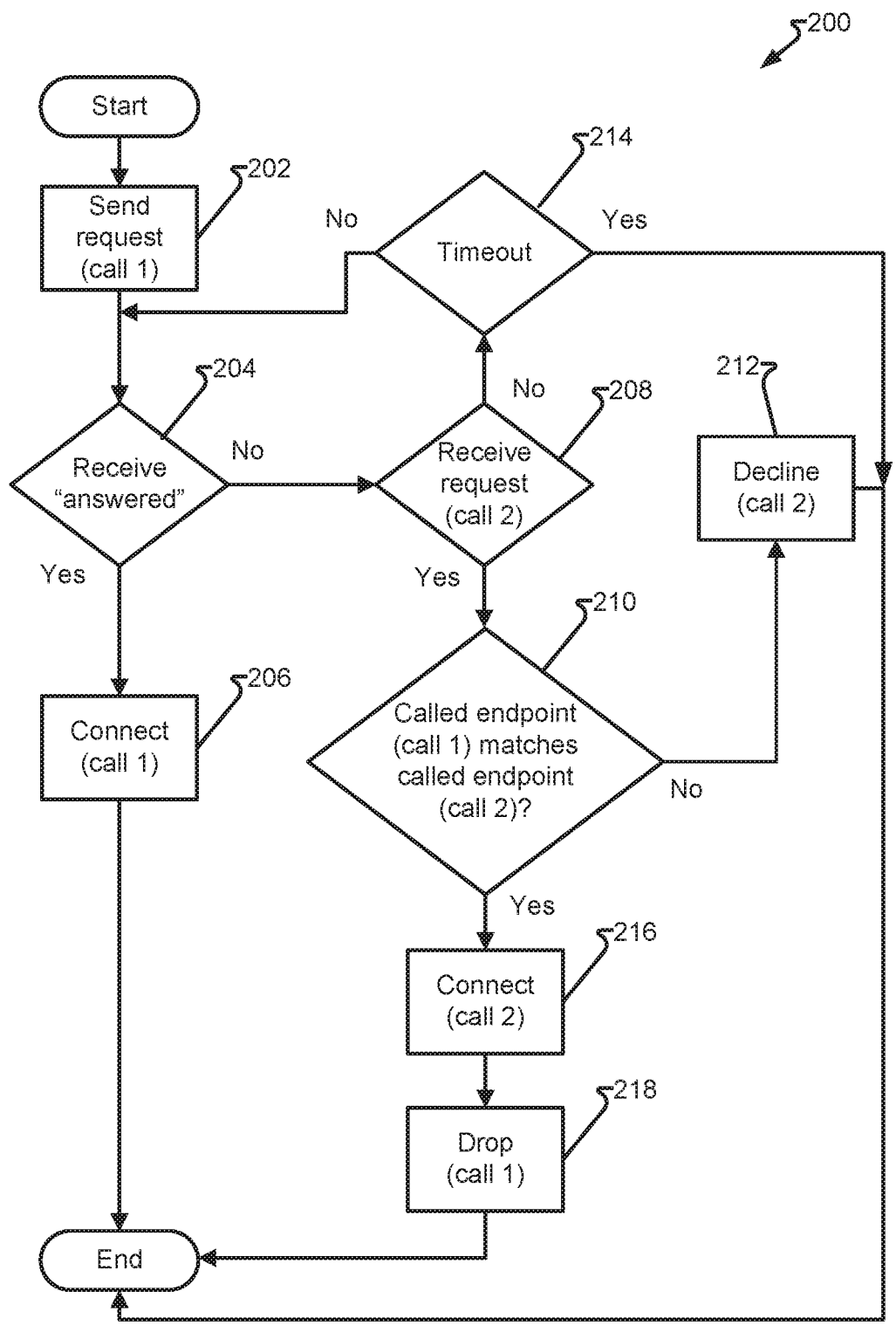
FIG. 2 depicts a first process in accordance with embodiments of the present disclosure.

FIG. 2 depicts a process 200 in accordance with embodiments of the present disclosure. In one embodiment, process 200 is embodied as circuitry and/or machine-executable instructions for execution by a processor, such as a processor of first endpoint 106, second endpoint 108, and/or server 112. Process 200 begins with one endpoint, for example first endpoint 106, initiating a call in step 202. The call may comprise messages on a signaling path to establish a dialog and, more specifically, may comprise the transmission of a SIP INVITE message to the destination, encoded pulses and/or tones (e.g., DTMF) to initiate the call to the destination address, such as a telephone number or SIP address of second endpoint 108. With step 202 complete the call has been initiated, however, a reply to the initiation (e.g., answer, "180 RINGING", busy-tone, "486 BUSY HERE") has not yet been received.

Next, test 204 determines if the call has been answered by the called endpoint and, if yes, the call is connected in step 206 and process 200 may then end. If test 204 is determined in the negative, the call has not yet been answered, and test 208 determines if any new calls have been received by the endpoint utilized in requesting the call in step 202. It should be appreciated that test 208 may comprise a monitoring step to monitors whether an incoming call has been received. If test 208 is determined in the negative, processing may continue to test 214 to determine if the call has timed-out and, if yes, process 200 may end or continue until the calling endpoint terminates the request (e.g., hangs up). If test 214 is determined in the negative, processing may continue, such as when the called endpoint is ringing or waiting to ring but not answered.

If test 208 is determined in the affirmative, a call has been received for the endpoint that has initiating the call in step 202. Next, test 210 determines if an identifier of the called endpoint matches an identifier of the incoming call. If test 210 is determined in the negative, such as when the incoming call is unrelated to the call imitated in step 202, the processing may continue to step 212 where the incoming call is declined. Step 212 may "ring busy" to the originator or route the call to a forwarding address or voicemail.

If test 210 is determined in the affirmative, such as when the endpoint called is also the endpoint now calling the originating endpoint, step 216 and step 218 may be executed to connect the incoming call (step 216) and discontinue the call originated in step 202 (step 218). Test 210 may determine wither the first identifier, associated with the destination of the call originated in step 202, is an exact match of the call received (e.g., caller ID). In other embodiments, a call may comprise a dialing code (e.g., "1" to place a long distance number, "9" to get an outside line, "+" for international dialing, etc.). Accordingly, the match may omit the dialing code from consideration of whether the identifiers match, for example "913035551212" may be determined to be a match to "3035551212". Additionally, the second identifier may comprise a name match to an address entry (e.g., LDAP). For example, first endpoint 106 may be calling "John Smith @303-555-1212" and receive a call from "John Smith @720-555-1212" and a match determined based on the name associated with the number. Additionally or alternatively, an identifier for an incoming call that is associated with a block or series of telephone numbers, such as for a business or other enterprise, may be determined to match an outgoing identifier for one particular number to the business or enterprise.

Figure 3A:
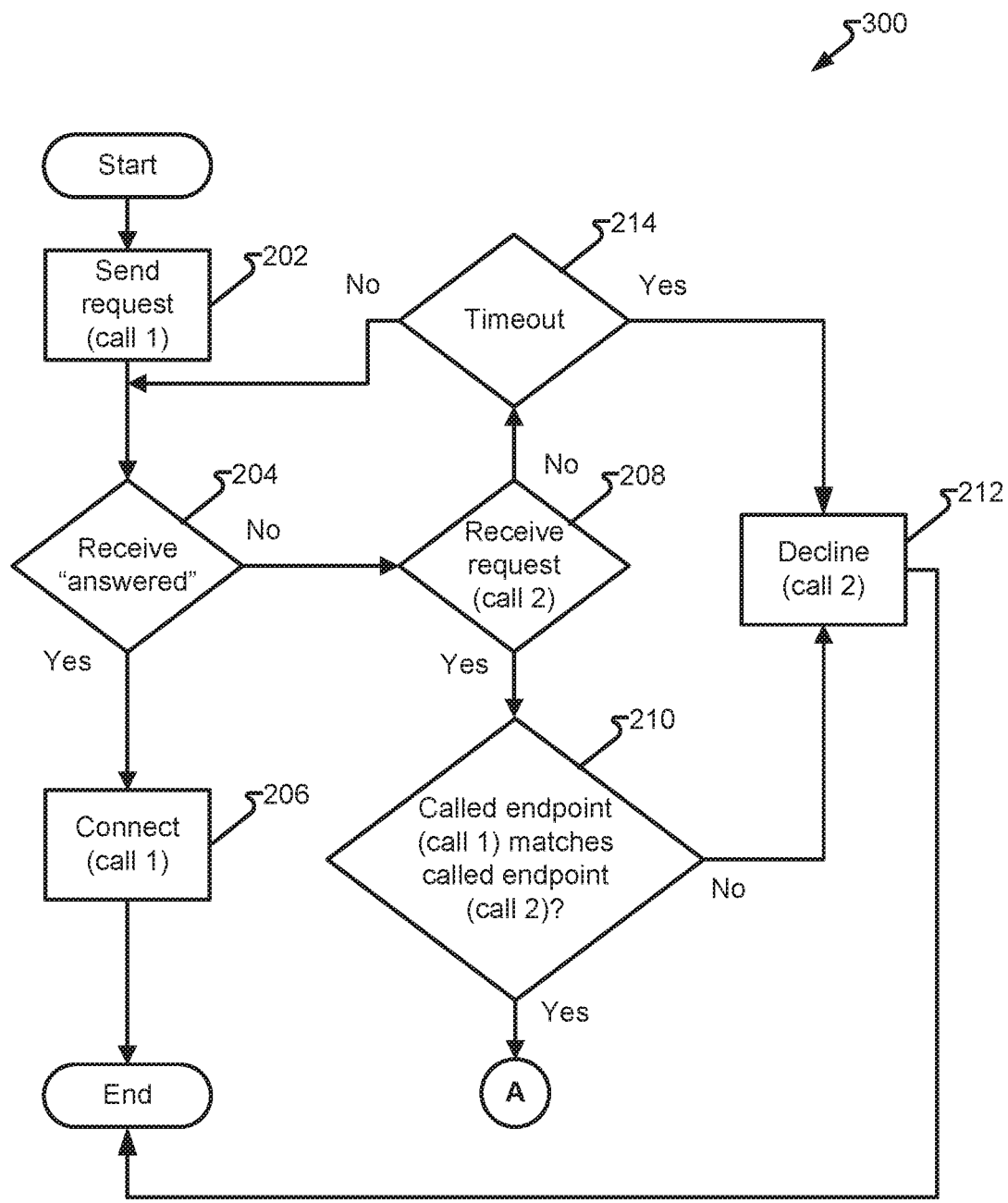
FIGS. 3A-3B depict a second process in accordance with embodiments of the present disclosure.
Figure 3B:
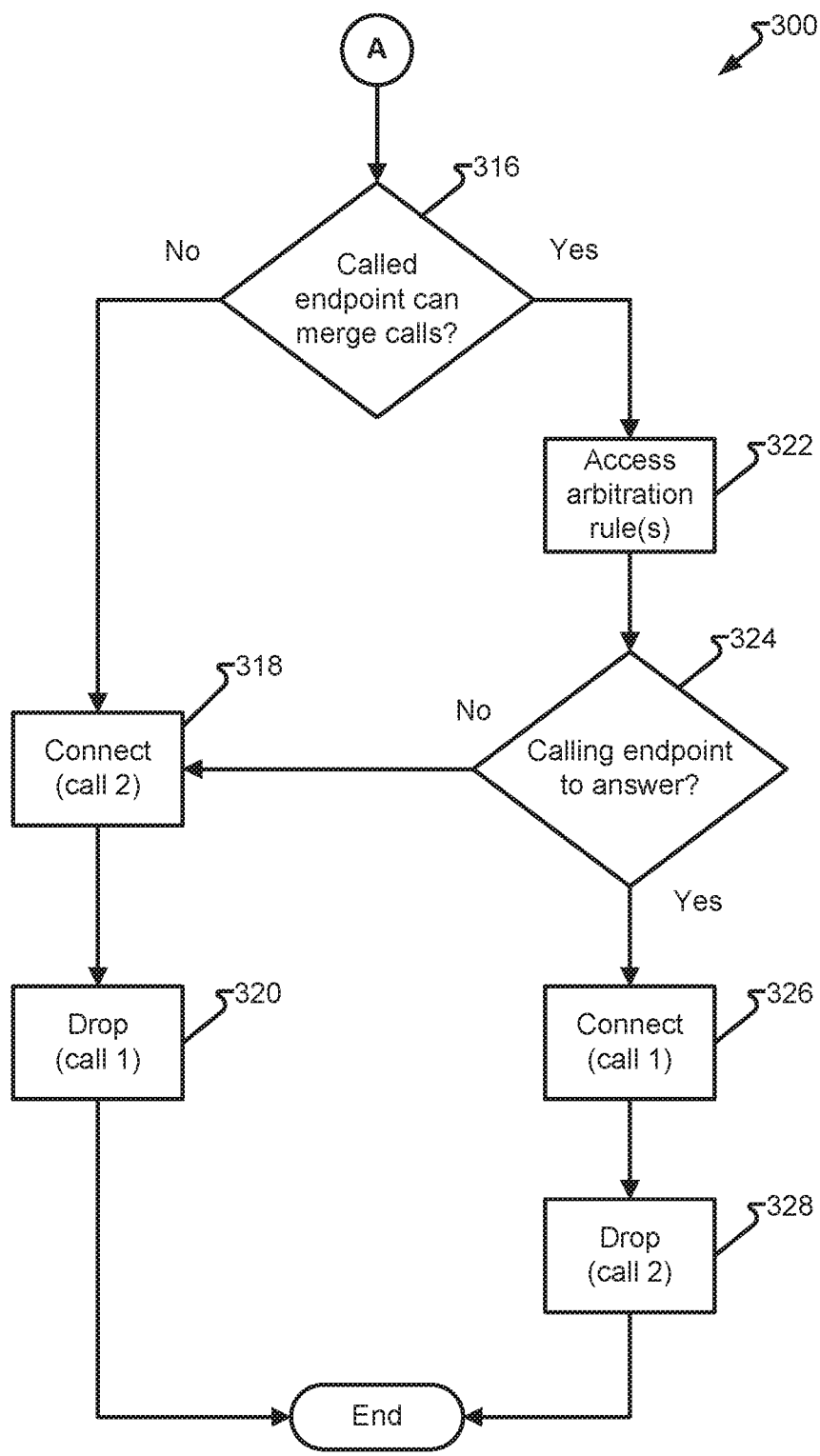

FIGS. 3A-3B depict process 300 in accordance with embodiments of the present disclosure. In one embodiment, process 300 is embodied as circuitry and/or machine-executable instructions for execution by a processor, such as a processor of first endpoint 106, second endpoint 108, and/or server 112. In one embodiment, process 300 comprises at least a portion of the steps of process 200 (see FIG. 2). However, process 300 diverges from process 200 upon test 210 determining that the called endpoint (e.g., the destination of the call originated in step 202) is the same as the incoming call. While first endpoint 106 may be configured to always discontinue the originated call and accept the incoming call, in other embodiments, both first endpoint 106 and second endpoint 108 comprise an ability to automatically accept the incoming call and drop their respective originated call. For example, due to signaling delays both first endpoint 106 and second endpoint 108 may place calls to each other at substantially the same time resulting in each of first endpoint 106 and second endpoint 108 both waiting for the other endpoint to answer and receiving a call from the other endpoint. If each of first endpoint 106 and second endpoint 108 was configured to answer the incoming call and drop the originating call, then each endpoint would accept the call and find the other party disconnected.

In one embodiment, process 300 provides logic to avoid simultaneous disconnection and delegate one, and only one, endpoint to accept their respective incoming call and terminate their respective outgoing call. Process 300, upon initiating a call to second endpoint 108 has now received a call from second endpoint 108 but neither call has been answered yet. Test 316 determines if the called endpoint (e.g., second endpoint 108) comprises functionality to merge the calls. An endpoint may communicate this ability via a new SIP message and/or encoding indicia into an existing SIP message. For example, the media capability field of SIP INVITE may be utilized to convey "merge" or other indicia to indicate that the endpoint that initiated the call may merge calls to avoid a race condition. In other embodiments, such as when SIP message encoding is not an option, first endpoint 106 may utilize data storage 114 and access a data structure to lookup a record to determine in a calling identifier is associated with an identifier associated with the ability to merge the calls. If test 316 is determined in the negative, then step 318 is executed by first endpoint 106 to connect the incoming call and, in step 320, drop the originated call.

If test 316 is determined in the affirmative, then at least one processor of first endpoint 106 and/or second endpoint 108, or optionally server 112, accesses one or more arbitration rules. The rule, or a particular set or hierarchy of rules, are preferably implemented to always pick the same endpoint to accept the call regardless of the device having the processor executing the test. For example, a called number may have a first identifier (e.g., telephone number) and a second identifier associated with an incoming call (e.g., caller ID). A numerical comparison may be performed and a designated one (e.g., the highest or the lowest) number being delegated to accept the call and discontinue their outgoing call. Additionally or alternatively, a data structure, such as may be encoded into a SIP message or maintained in data storage 114 may comprise a data record of fees or rates, may indicate which endpoint will pay a higher fee for accepting the call and, the lowest fee endpoint being delegated to accept the incoming call and discontinue their outgoing call. In response to evaluating the rule(s) in step 322, test 324 determines if the calling endpoint for the first call (e.g., first endpoint 106) is to answer the call. If test 324 is determined in the negative, steps 318 and 320 are executed by the calling endpoint of the first call and the incoming call is accepted (step 318) and the outgoing call discontinued (step 320). Step 322 may determine which endpoint is subject to carrier fees (e.g., long distance fees, roaming fees, etc.). Rules may also be utilized to select one endpoint when the endpoints request different media. For example, first endpoint 106 may request a voice-only call whereas second endpoint 108 may request a voice-video call. Accordingly, one endpoint may be selected which, in some embodiments, may be the voice-only call and in other embodiments may be the voice-video call.

If test 324 is determined in the affirmative, step 326 is performed by the called endpoint for the first call (second endpoint 108), which then connects the first call in step 326 and discontinues its own call in step 328. Accordingly, first endpoint 106 is connected via the call originated in step 202 and the received call is dropped.

Figure 4:
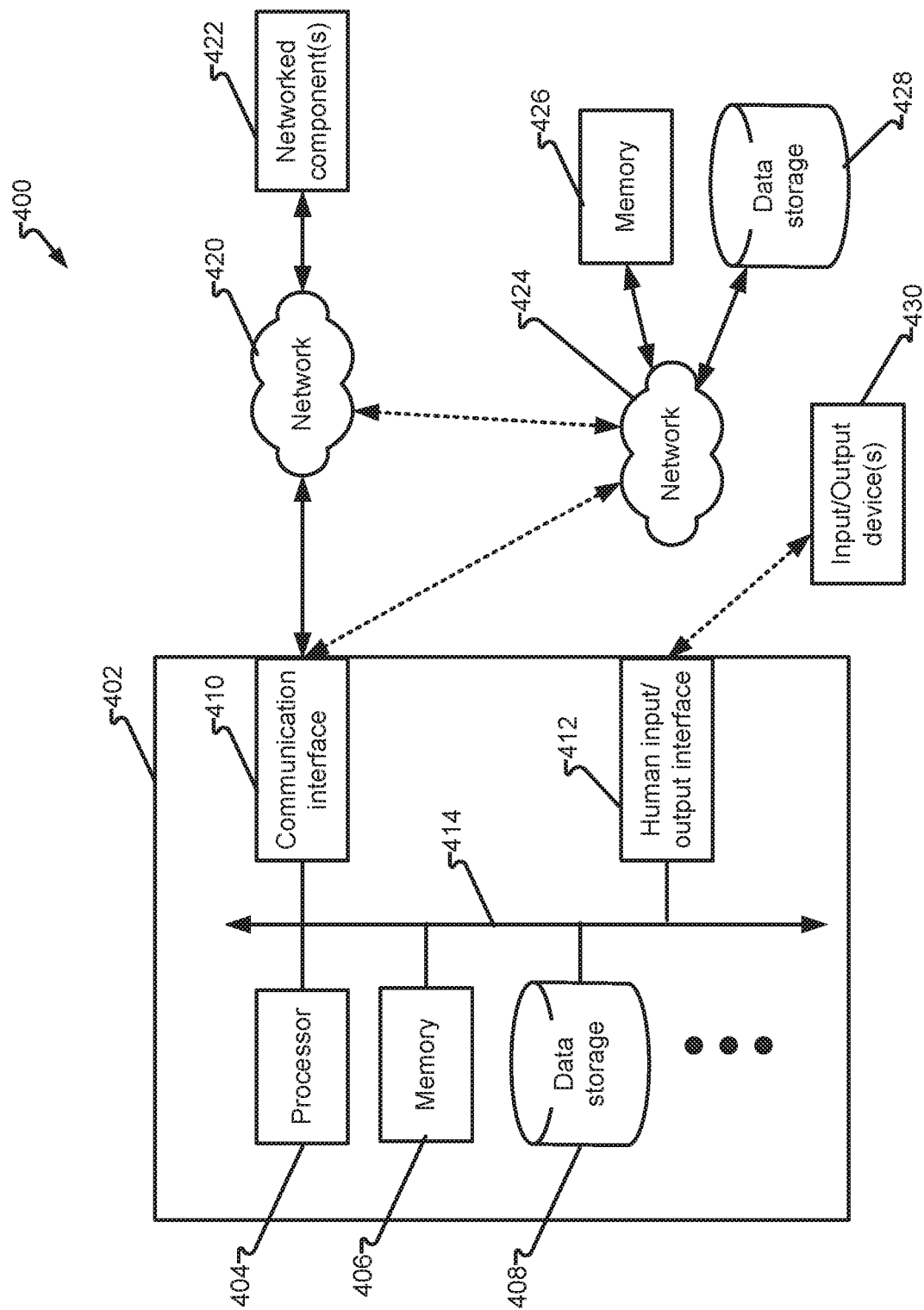
FIG. 4 depicts a second system in accordance with embodiments of the present disclosure.

FIG. 4 depicts device 402 in system 400 in accordance with embodiments of the present disclosure. In one embodiment, first endpoint 106 and/or second endpoint 108 may be embodied, in whole or in part, as device 402 comprising various components and connections to other components and/or systems. The components are variously embodied and may comprise processor 404. Processor 404 may be embodied as a single electronic microprocessor or multi-processor device (e.g., multicore) having therein components such as control unit(s), input/output unit(s), arithmetic logic unit(s), register(s), primary memory, and/or other components that access information (e.g., data, instructions, etc.), such as received via bus 414, executes instructions, and outputs data, again such as via bus 414.

In addition to the components of processor 404, device 402 may utilize memory 406 and/or data storage 408 for the storage of accessible data, such as instructions, values, etc. Communication interface 410 facilitates communication with components, such as processor 404 via bus 414 with components not accessible via bus 414. Communication interface 410 may be embodied as a network port, card, cable, or other configured hardware device. Additionally or alternatively, human input/output interface 412 connects to one or more interface components to receive and/or present information (e.g., instructions, data, values, etc.) to and/or from a human and/or electronic device. Examples of input/output devices 430 that may be connected to input/output interface include, but are not limited to, keyboard, mouse, trackball, printers, displays, sensor, switch, relay, etc. In another embodiment, communication interface 410 may comprise, or be comprised by, human input/output interface 412. Communication interface 410 may be configured to communicate directly with a networked component or utilize one or more networks, such as network 420 and/or network 424.

Network 110 may be embodied, in whole or in part, as network 420. Network 420 may be a wired network (e.g., Ethernet), wireless (e.g., WiFi, Bluetooth, cellular, etc.) network, or combination thereof and enable device 402 to communicate with network component(s) 422.

Additionally or alternatively, one or more other networks may be utilized. For example, network 424 may represent a second network, which may facilitate communication with components utilized by device 402. Components attached to network 424 may include memory 426, data storage 428, input/output device(s) 430, and/or other components that may be accessible to processor 404. For example, memory 426 and/or data storage 428 may supplement or supplant memory 406 and/or data storage 408 entirely or for a particular task or purpose. For example, memory 426 and/or data storage 428 may be an external data repository (e.g., server farm, array, "cloud," etc.) and allow device 402, and/or other devices, to access data thereon. Similarly, input/output device(s) 430 may be accessed by processor 404 via human input/output interface 412 and/or via communication interface 410 either directly, via network 424, via network 420 alone (not shown), or via networks 424 and 420.

It should be appreciated that computer readable data may be sent, received, stored, processed, and presented by a variety of components. It should also be appreciated that components illustrated may control other components, whether illustrated herein or otherwise. For example, one input/output device 430 may be a router, switch, port, or other communication component such that a particular output of processor 404 enables (or disables) input/output device 430, which may be associated with network 420 and/or network 424, to allow (or disallow) communications between two or more nodes on network 420 and/or network 424. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A calling endpoint, comprising:
   a processor;
   a data storage comprising a non-transitory data storage component accessible to the processor;
   a network interface connecting the processor to a network for communications thereon; and
   wherein the processor performs:
      initiating a first request, for a first call to a called endpoint via the network, the first request comprising a first identifier of the called endpoint;
      before the first request is accepted by the called endpoint and before receiving a reply to the initiated first request, receiving a second request, via the network, for a second call from a second calling endpoint, wherein the second calling endpoint is associated with a second identifier; and upon determining that the first identifier and the second identifier match, accepting one of the first call or the second call and discontinuing the other of the first call or the second call.

2. The calling endpoint of claim 1, wherein accepting one of the first call or the second call and discontinuing the other of the first call or the second call, further comprises accepting the second call and discontinuing the first call and wherein accepting the second call comprises the processor joining the second call to the first call and, after the joining has completed, the processor performs the discontinuing of the first call.

3. The calling endpoint of claim 1, wherein the processor determining the first identifier and the second identifier do not match, rejecting the second call.

4. The calling endpoint of claim 1, wherein the second identifier comprises caller identification (Caller ID).

5. The calling endpoint of claim 1, wherein the processor performs determining that the first identifier and the second identifier match upon determining the data storage comprises a record identifying the second identifier with an alias that is a match to the first identifier.

6. The calling endpoint of claim 1, wherein the processor performs determining that the first identifier and the second identifier match upon determining the first identifier comprises a telephone number and a dialing code and the telephone number matches the second identifier.

7. The calling endpoint of claim 1, wherein the processor further performs:
determining whether the called endpoint comprises an ability to perform the accepting of the second call and the discontinuing the first call;
upon determining the called endpoint comprises the ability to perform the accepting of the second call and the discontinuing the first call, accessing an arbitration rule from the data storage; and
wherein accepting one of the first call or the second call and discontinuing the other of the first call or the second call, further comprises selectively performing the accepting of the second call and the discontinuing the first call in accordance with a result of the arbitration rule.

8. The calling endpoint of claim 7, wherein the arbitration rule comprises a determination of one of a highest numerical value or lowest numerical value of the first identifier and the second identifier, the result of the arbitration rule comprises an indicia that the calling endpoint is to perform accepting one of the first call or the second call and discontinuing the other of the first call or the second call, comprising accepting the second call and discontinuing the first call, and further performing accepting the second call upon the calling endpoint having the one of the highest numerical value or lowest numerical value.

9. The calling endpoint of claim 7, wherein the arbitration rule comprises a determination of a cost to accept one of the first call or the second call by each of the called endpoint and the calling endpoint and, when the cost is least for the calling endpoint to accept the one of the first call or the second call, the result of the arbitration rule comprises an indicia that the calling endpoint is to accept the second call.

10. A method, comprising:
initiating a first request, for a first call to a called endpoint via a network, the first request comprising a first identifier of the called endpoint;
before the first request is accepted by the called endpoint and before receiving a reply to the initiated first request, receiving a second request, via the network, for a second call from a second calling endpoint, wherein the second calling endpoint is associated with a second identifier; and
upon determining that the first identifier and the second identifier match, accepting one of the first call or the second call and discontinuing the other of the first call or the second call.

11. The method of claim 10, wherein accepting one of the first call or the second call and discontinuing the other of the first call or the second call, further comprises accepting the second call and discontinuing the first call and wherein accepting the second call further comprises joining the second call to the first call and, after the joining has completed, discontinuing of the first call.

12. The method of claim 10, further comprising: upon determining that the first identifier and the second identifier do not match, rejecting the second call.

13. The method of claim 10, wherein determining that the first identifier and the second identifier match further comprises determining a data storage comprises a record identifying the second identifier with an alias that is a match to the first identifier.

14. The method of claim 10, wherein the determining that the first identifier and the second identifier match further comprises determining the first identifier comprises a telephone number and a dialing code and the telephone number matches the second identifier.

15. The method of claim 10, further comprising:
determining whether the called endpoint comprises an ability to perform the accepting of the second call and the discontinuing the first call;
upon determining the called endpoint comprises the ability to perform the accepting of the second call and the discontinuing the first call, accessing an arbitration rule from a data storage; and
wherein the accepting of one of the first call or the second call and discontinuing the other of the first call or the second call further comprises selectively performing the accepting of the one of the second call or second call and the discontinuing the other of the first call or the second call in accordance with a result of the arbitration rule.

16. The method of claim 15, wherein the arbitration rule comprises a determination of one of a highest numerical value or lowest numerical value of the first identifier and the second identifier, the result of the arbitration rule comprises an indicia that the calling endpoint is to accept the second call upon the calling endpoint having the one of the highest numerical value or lowest numerical value.

17. The method of claim 15, wherein the arbitration rule comprises a determination of a cost to accept the one of the first call or the second call by each of the called endpoint and the calling endpoint and, when the cost is least for the calling endpoint to accept the call, the result of the arbitration rule comprises an indicia that the calling endpoint is to accept the second call.

18. A communication server, comprising:
a processor;
a data storage comprising a non-transitory data storage component accessible to the processor;
a network interface connecting the processor to a network for communications thereon; and wherein the processor performs:
- receiving a first request for a first call, the first call being received from a calling endpoint via the network and the first request comprising a first identifier for a called endpoint;
- initiating the first request for the first call to the called endpoint;
- before the first request is accepted by the called endpoint and without receiving a reply to the first request, receiving a second request for a second call to the calling endpoint, the second request being from a second calling endpoint associated with a second identifier; and
- upon determining that the first identifier and the second identifier match, accepting one of the first call or second call and discontinuing the other of the first call or second call.

19. The communication server of claim 18, wherein accepting one of the first call or the second call and discontinuing the other of the first call or the second call further comprises accepting the second call further comprises the processor joining the second call to the first call and, after the joining has completed, the processor performs the discontinuing of the first call.

20. The communication server of claim 18, wherein the processor further performs:
- the accepting of the second call and the discontinuing the first call in accordance with a result of an arbitration rule indicating the second call should be accepted; and
- wherein the arbitration rule indicates the second call should not be accepted, accepting the first call and disconnecting the second call.

* * * * *